United States Patent [19]

Layne

[11] 4,222,667

[45] Sep. 16, 1980

[54] FIZEAU FRINGE LIGHT EVALUATOR AND METHOD

[75] Inventor: Charles R. Layne, Orlando, Fla.

[73] Assignee: Martin Marietta Corporation, Orlando, Fla.

[21] Appl. No.: 827,430

[22] Filed: Aug. 24, 1977

[51] Int. Cl.² .............................................. G01B 9/02
[52] U.S. Cl. ..................................... 356/346; 356/352
[58] Field of Search .................... 356/106 S, 112, 346, 356/352

[56] References Cited

U.S. PATENT DOCUMENTS

| | | | |
|---|---|---|---|
| 3,217,591 | 11/1965 | Barr et al. | 356/112 |
| 3,824,018 | 7/1974 | Crane, Jr. | 356/112 |

Primary Examiner—John K. Corbin
Assistant Examiner—Matthew W. Koren
Attorney, Agent, or Firm—Julian C. Renfro; Gay Chin; Frederick G. Michaud

[57] ABSTRACT

A beam of light to be evaluated for coherence length is projected through an optical cavity having non-parallel reflecting surfaces to form a Fizeau fringe pattern. A multiple detector array senses the light output of the cavity at various locations along the fringe pattern. The sensed values of the light are compared with one another and the polarity of their difference is used to determine whether the coherence length of the light beam is above a predetermined threshold value.

21 Claims, 8 Drawing Figures

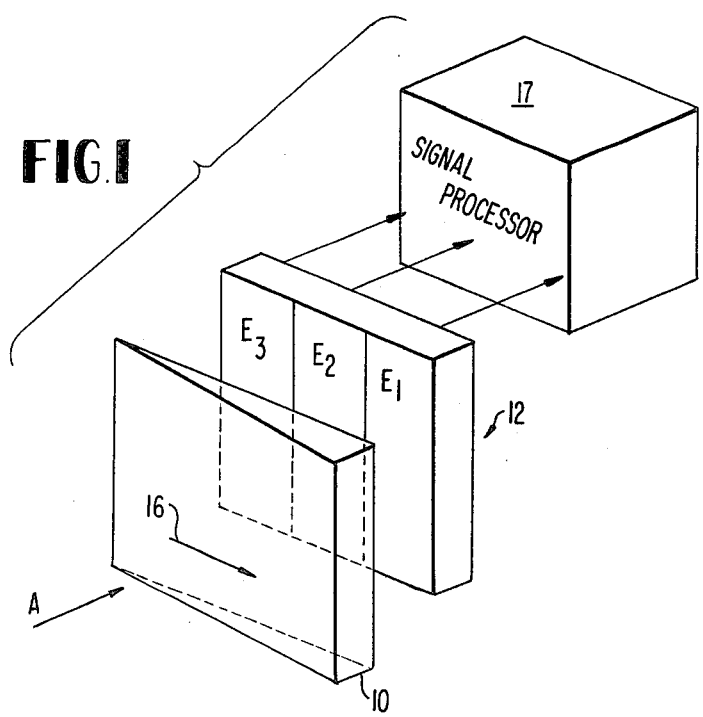
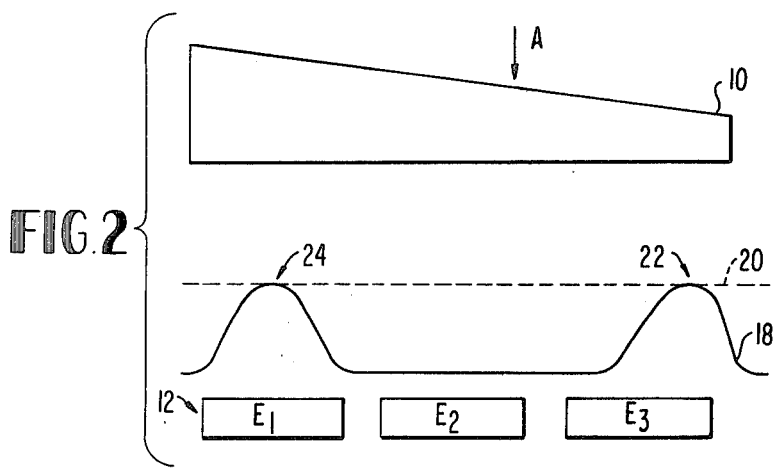
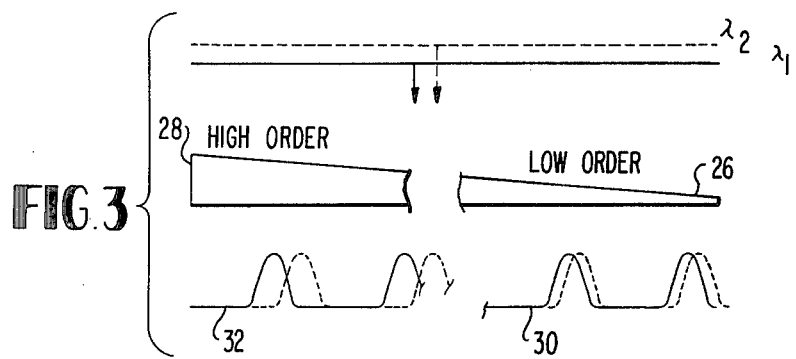

THEORETICAL VS MEASURED FRINGE PATTERN PROFILE

FIZEAU FRINGE LIGHT EVALUATOR AND METHOD

BACKGROUND OF THE INVENTION

The invention relates to a method and apparatus for evaluating the frequency or wavelength properties of a light beam and, more particularly, to a method and apparatus for determining whether a laser beam has frequency properties meeting predetermined criteria through the use of a fringe pattern of alternating light and dark bands which represent particular frequency properties of the beam.

The utilization of laser light in various fields of technology is becoming more and more widespread. In many laser applications, it is necessary to know the makeup of the laser light beam in terms of the bandwidth of radiation which constitutes the major portion of light beam. This makeup is usually referred to as the spectral content of the light beam and is often defined in terms of the range of frequencies or wavelengths of radiation contained in the beam.

Ideally, monochromatic light consists of electromagnetic radiation of a single frequency $\nu$ or wavelength $\lambda$. In practical applications, however, monochromatic radiation is characterized by a center frequency $\nu_o$ and a bandwidth $\Delta\nu$ such that a frequency interval $\nu_o - \Delta\nu/2$ to $\nu_o + \Delta\nu/2$ contains a large part of the energy of the radiation. It is the extent of this range or interval of frequencies which is of particular interest in the application of laser light. For example, this information is useful in the field of holography where light composed of radiation falling within a maximum allowable frequency range is necessary for proper imaging. Instruments which are responsive to laser light, such as optical countermeasure receivers, may require substantially monochromatic light of a narrow bandwidth as well.

A common method of expressing the spectral content of a light beam is in terms of its coherence length. The coherence length $L_c$ may be defined as $L_c = c/\Delta\nu$, where c is the speed of light and $\Delta\nu$ is known as the temporal bandwidth. Since the coherence length is inversely proportional to bandwidth, it can be seen that for applications of laser light such as those discussed previously, it is desirable that the light beam have a maximum attainable coherence length. Light having at least a predetermined minimum coherence length is typically referred to as "coherent light", i.e. light comprised of electromagnetic radiation with a major portion of the radiation energy falling within a predetermined relatively narrow bandwidth of frequencies or wavelengths.

At present, the only successful method of measuring the coherence length of a light beam is through the use of multiple beam interferometers. An optical device such as a Fabry-Perot etalon breaks up a beam of light into a number of beams which interfere with one another to create a fringe pattern indicative of the spectral content as a function of radiation wavelength or frequency of the beam, the angle of incidence of the beam on the etalon and the distance along the face of the etalon from a predetermined edge thereof. The fringe pattern is analyzed to determine the coherence length of the light beam.

When this analysis is to be done electronically with light detectors, complex and costly circuitry is required in accordance with prior devices. For example, in U.S. Pat. No. 3,824,018 to Crane a frequency discriminator, among other components, is called for. Also shown in this patent, as is typical of most prior art systems, is the need for an etalon having relatively low finesse.

Finesse is a property of an interferometer which is determined by the reflectivity of the reflecting surfaces of the interferometer. It is a measure of the width of a band of light in a fringe pattern in relation to its distance from the light band of an adjacent order for monochromatic light. Use of a low finesse etalon results in a fringe pattern in which the light and dark bands are less sharply defined. This limits the degree of resolution which can be obtained in the analysis of the fringe pattern.

Many of the prior art coherence length measurement systems utilize a plurality of etalons with each etalon having a light detector associated therewith. Such systems present manufacturing problems because only extremely low tolerances are acceptable in the design of the etalons in order to obtain the small thickness differential between etalons which is necessary to achieve a valid coherence length measurement.

Design problems are also encountered in the prior art systems. A number of design variables such as the coherence length threshold (i.e. the minimum coherence length that is useful in a particular application), the spectral range of measurement for which the system is designed, the number of light detectors used and the finesse of the etalon are interactive and cannot be independently controlled, resulting in unwanted compromises in measurement and extreme complexity.

OBJECTS AND BRIEF SUMMARY OF THE INVENTION

Accordingly, it is an object of the invention to provide a novel method and apparatus for the detection of the coherence length of a laser beam which is capable of simple and economical operation.

It is another object of the invention to provide a novel method and apparatus for coherence length detection which utilizes a single optical device having moderate tolerances and a single light detector array.

It is a further object of the invention to provide a novel method and apparatus for coherence length detection utilizing an interferometer having a relatively high level of finesse in comparison with prior art methods and devices and yet meeting the foregoing objectives.

It is yet another object of the invention to provide a novel method and apparatus for coherence length detection which allow independent control of previously interactive design variables for more accurate coherence length detection.

These and other objects of the invention are accomplished with the use of a multiple beam interferometer having non-parallel reflecting surfaces to generate a Fizeau fringe pattern. The light which makes up the Fizeau fringe pattern is sensed at a plurality of points along the fringe pattern and the sensed values are compared with one another to determine whether the coherence length of the light beam is above a predetermined threshold length. The simplicity of the apparatus and its operation results from the use of relative intensities rather than the absolute intensity of the light in the fringe pattern.

In accordance with the disclosed embodiment of the invention, the light sensing is performed by an array of light detectors located so as to intercept the Fizeau fringe pattern. A value proportional to the value of the light sensed by one detector has subtracted therefrom the output value of another sensor. This is repeated for each detector, and the polarities of the differences obtained by these comparisons are evaluated to determine the coherence length of the light relative to the predetermined value.

BRIEF DESCRIPTION OF THE DRAWINGS

FIG. 1 is a perspective view of the physical relationship of the wedge-shaped multiple beam interferometer and the light detectors in accordance with the invention;

FIG. 2 is a side view of the components illustrated in FIG. 1 in combination with a graph of Fizeau fringe pattern light intensity, to generally illustrate the operation of the invention;

FIG. 3 is a side view of two multiple beam interferometers of different thicknesses in combination with graphs of Fizeau fringe pattern light intensities to illustrate the effect of thickness of the interferometer upon the fringe pattern;

DETAILED DESCRIPTION OF THE DRAWINGS

Figure 5:
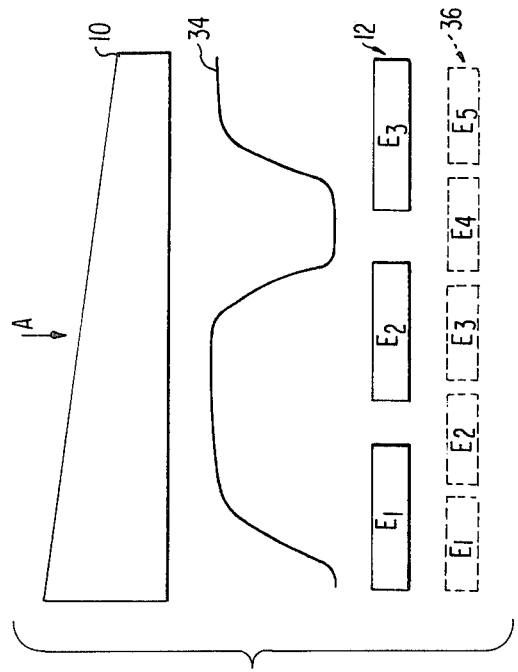
FIG. 5 is a view similar to that of FIG. 2, illustrating the relationship of the number of detectors to spectral range discrimination.

FIG. 1 generally illustrates one embodiment of the invention in which an optical cavity 10 produces a fringe pattern that is detected by a detector array 12. The signals from the detector array are then processed by a signal processor described hereinafter in detail to produce an indication of the coherence length of a beam of light A directed onto the optical cavity relative to a predetermined threshold value. It should be understood that the optical cavity 10 and detector array 12 are mounted in a suitable housing in actual use of the invention. However, the housing is not shown in order to facilitate a description of the cavity and detector array.

As shown in FIG. 1, the optical cavity 10 comprises a wedge-shaped block of light transmissive material whose surfaces are partially silvered. In an alternative form, the cavity can be made of two flat transparent plates with an air space between them, the air space varying in thickness in one direction along the plates. The cavity 10 breaks up the beam of light A into a plurality of beams which generate an interference fringe pattern, commonly called a Fizeau fringe pattern, indicative of the wavelengths of light present in the light beam A. Specifically, the distance between reflecting surfaces, or thickness, of the cavity at each point where a high peak of light intensity occurs in the fringe pattern is an integral number of half wavelengths of the light content of the beam. A device such as optical cavity 10 which breaks up a beam of light into a plurality of light beams to create a fringe pattern is generally known as a multiple beam interferometer.

In accordance with the invention, a light detector assembly 12 is positioned to intercept the light exiting the cavity 10. The detector assembly 12 senses the light which constitutes the fringe pattern at various locations of expeated maximum and minimum intensities for a particular coherence length in the direction of varying thickness of the wedge along the fringe pattern, as shown by arrow 16. The light sensed at these various locations produces signals which are used by a signal processor 17 to determine the coherence length of light beam A, as will be explained in connection with FIGS. 2 and 7.

In accordance with the invention, the light detector assembly 12 comprises a plurality of spaced light detectors. In the embodiment of the invention illustrated in FIG. 1, the light detector assembly 12 is made up of an array of three light detectors, $E_1$, $E_2$ and $E_3$. This array is positioned to sense the light of three discrete segments of the fringe pattern, the segments being divisions of the fringe pattern along the length thereof in the direction of arrow 16. The light impinging on each detector is compared by the processor 17 with the integrated value obtained from the other sensors for a determination of coherence length.

FIG. 2 illustrates the operation of the invention employing the three detector array. Solid line 18 and dotted line 20 represent the intensity of light with respect to distance along the length of optical cavity 10 of a Fizeau fringe pattern for coherent and non-coherent light, respectively. Coherent light, i.e. light having a predetermined minimum coherence length, produces peaks of intensity 22 and 24 only at those points along the length of the cavity 10 where the thickness of the cavity is an integral number of half wavelengths of the content of the coherent light, as explained previously. As the bandwidth of the light beam is increased, the peaks become broader. Thus when "white" light is projected through the cavity, the Fizeau fringe consists of uniform intensity, as shown by dotted line 20, since its frequency content is substantially continuous across the entire frequency spectrum of light.

As was previously mentioned, the energy or intensity of the light in each particular segment of the fringe pattern is integrated over the area of its associated light detector to obtain an output signal indicative of the makeup of that segment. For coherent light, it can be seen that the output signals of detectors $E_1$ and $E_3$ of FIG. 2 are high with respect to that of $E_2$. On the other hand, for noncoherent light as represented by dotted line 20, the output signals of each of the three detectors are substantially equal.

In accordance with the illustrated embodiment, the signals processor 17 compares the detector output signal to determine whether or not the light beam is coherent. The signal processor performs the following calculations in determining coherence length acceptability: 0.9 times the value of the output signal $V_1$ of detector $E_1$ has subtracted therefrom the value of the output signal $V_2$ of detector $E_2$; 0.9 times the value of the output signal $V_2$ of detector $E_2$ has subtracted therefrom the output signal $V_3$; and 0.9 times the value of detector output signal $V_3$ has subtracted therefrom output signal $V_1$.

Referring to FIG. 2, it can be seen that for coherent light, $0.9V_1-V_2$ yields a positive result, but $0.9V_2-V_3$ and $0.9V_3-V_1$ gives negative differences. On the other hand, for non-coherent light, $0.9V_1-V_2$, $0.9V_2-V_3$ and $0.9V_3-V_1$ all yield negative results. It is the presence or absence of a positive result in the signal processing technique which is indicative or coherent or non-coherent light, respectively.

The 0.9 multiplication factor utilized in processing the detector output signals is reflective of the level of tolerence which is acceptable in the coherence length measurement, a higher multiplication factor indicating a lower tolerance level. Appropriate selection of the multiplication factor allows for differences in gain and the presence of noise in the electrical components which perform the sensing and algebraic comparison functions. It will be appreciated that the multiplication or tolerance factor also has an effect on the threshold value of coherence length for which the device is designed. As the multiplication factor is lowered, the acceptable bandwidth is broadened. The acceptable bandwidth is also broadened by reducing the cavity thickness, as explained in more detail hereinafter. The 0.9 factor disclosed here is merely for the purpose of illustration. The actual figure to be used would be determined in accordance with the specific characteristics and requirements of a measurement device constructed in accordance with the invention.

Another factor to be considered in the construction of the instrument is the wavelength of light to be examined. At the outset, a particular wavelength, $\lambda\max$, is selected which will be the maximum wavelength for which the instrument is designed. This value is used in determining the thickness differential of the optical cavity, which is $\lambda\max/2 \times n$, where n is the index of refraction of the material which constitutes the cavity. Use of such a differential limits to one the number of bands of light representative of $\lambda\max$ in the generated fringe pattern. This assures more accurate evaluation by eliminating multiple detections of light of the same wave length.

It will also be appreciated that the actual thickness of the cavity will affect the properties of the instrument. As is known with interferometers of this type, the thickness of the cavity is determinative of the order of the band of light measured in the fringe pattern. For monochromatic light, the zero order band of light is that band of light present in the fringe pattern where the two reflecting surfaces intersect, i.e. where the optical path length in the cavity is zero. As the path length within the cavity increases, successively higher number order bands of light are generated in the fringe pattern, the number being indicative of the integral number of half wavelengths of the monochromatic light in the length of the optical path.

The order of light bands measured is relevant in that it is determinative of the separation of the bands of light in the Fizeau fringe pattern representative of different wavelengths of light present in the light beam being analyzed. FIG. 3 illustrates this characteristic with respect to two thicknesses of optical cavities.

In FIG. 3, a beam of light composed of radiation of two wavelengths $\lambda_1$ and $\lambda_2$ is projected onto two optical cavities 26 and 28 of different thicknesses. Cavity 26 is relatively thin and the bands of light present in its generated Fizeau fringe pattern are of low order. Curve 30 illustrates the intensity of light in a Fizeau fringe pattern generated by optical cavity 26, with the solid line peaks representative of light of wavelength $\lambda_1$ and the dotted line peaks representative of light of wavelength $\lambda_2$. Since the length of the optical path within the cavity is relatively close to the difference between $\lambda_1$ and $\lambda_2$, the peaks of intensity occur close to each other in the fringe pattern and appear almost as a single peak, as shown by curve 30. On the other hand, a thicker cavity 28 which generates higher order bands of light has an optical path whose length is greater than the difference between $\lambda_1$ and $\lambda_2$. This change in path length separates the bands of light in the fringe pattern representative of light of wavelengths $\lambda_1$ and $\lambda_2$, as shown by curve 32. Thus, a thicker cavity permits better discrimination between adjacent bands of light and therefore provides a longer coherence length threshold value.

As is known with multiple beam interferometers, the angle at which the beam of light is incident upon the interferometer has an effect on the fringe pattern generated. For the wedge shaped cavity used in the invention, the angle of incidence merely affects the placement of the fringe pattern relative to the interferometer. Referring to FIG. 3, varying the angle of incidence from normal as shown would merely cause the curves 30 and 32 to shift to the left, up the wedge. No significant change in the shape of the curves or the separation of peaks of different wavelength would occur. The separation of peaks at the same wavelength will increase with the secant of the angle of incidence. The shape of the fringe peaks will be changed by a minor predictable degree, becoming unsymmetrical at large angles of incidence. The degree of non-symmetry increases with finesse and the magnitude.

Figure 4:
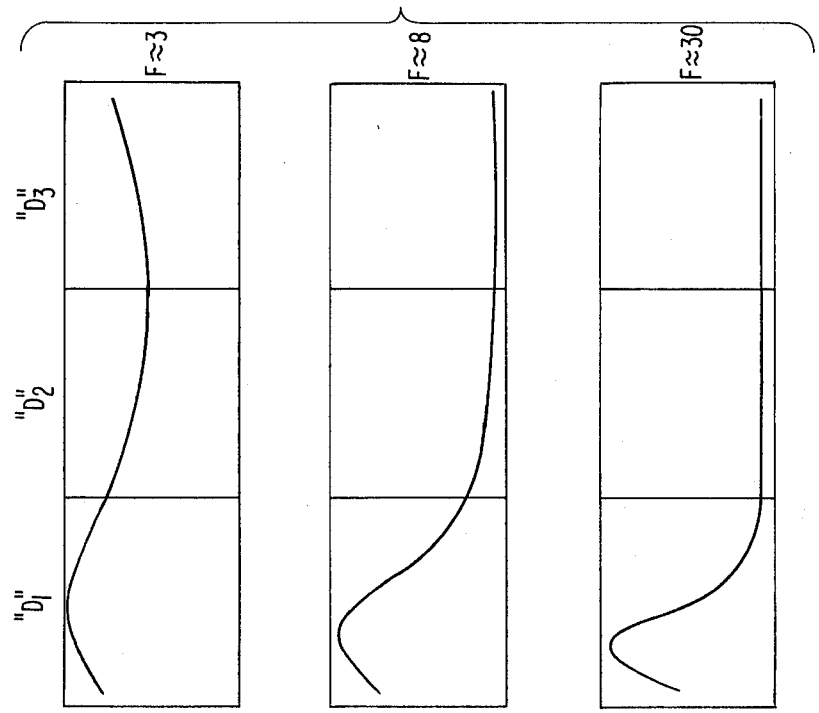
FIG. 4 is a block diagram of three light detector arrays with a graph of light intensity of a different Fizeau fringe pattern superimposed on each to illustrate the effect of finesse on the measurement of the fringe pattern.

Referring now to Table I and FIG. 4, the effect of finesse on the coherence length discrimination measurement is illustrated for a three detector array. Table I lists a range of reflectivities from 0.3 to 0.8 and the value of finesse which is associated with each reflectivity value. The third and fourth columns list a standardized value of the intensity of light in a fringe pattern integrated over the area of detectors $D_1$ and $D_2$ of the three detector array, such as is shown in FIG. 4, for a beam of light having a wavelength of $1.0\mu$ which is projected onto a wedge shaped interferometer having the associated finesse listed. The fifth column lists the difference of the values in the third and fourth columns. FIG. 4 illustrates the intensity of light in the fringe pattern across the detector array for three selected values of finesse.

As can be seen in FIG. 4, as the value of finesse is increased, the width of a band of light decreases and the band becomes more pronounced. It has been found that the best results are obtained when the finesse is adjusted so that the width of a band of light, as represented by the peak on detector $D_1$, is substantially equal to the width of one photo detector in the array, such as is shown in FIG. 4 for the example where finesse is approximately equal to 8. This occurs when the refectivity of the surfaces of the interferometer is in the range of 0.4 to 0.5. When the reflectivity is increased beyond this point, the finesse is increased and the band of light is narrowed such that the difference in the values obtained from the two adjacent detectors is not as great, as shown in the last three examples of Table I, providing a lesser degree of resolution in the measurement.

The values disclosed herein relate to optimum finesse for a three detector array. It is apparent that if an array having a larger number of detectors is utilized, wherein the width of each detector is decreased, a higher finesse value which correlates the width of an intensity peak with detector width would provide optimum results.

TABLE I

| Reflectivity | Finesse | $D_1$ | $D_2$ | $D_1-D_2$ |
|---|---|---|---|---|
| .3 | 2.45 | .84 | .42 | .42 |
| .4 | 4.44 | .75 | .30 | .45 |
| .5 | 8.00 | .66 | .19 | .47 |
| .6 | 15.00 | .55 | .12 | .43 |
| .7 | 31.11 | .43 | .06 | .37 |
| .8 | 50.00 | .29 | .025 | .26 |

FIG. 5 illustrates how the number of light detectors can be varied to change the bandwidth for which the discrimination testing is being done. Line 34 represents the intensity of a Fizeau fringe pattern of a light beam whose spectral content is broader than that of the beam represented by line 18 of FIG. 2 but less than continuous over the entire spectrum. For the purpose of illustration, assume that the spectral content of the light beam lies within a bandwidth of 80 Angstroms. Further assume that the three detector array shown in solid lines is capable of detecting whether the light beam is coherent within a range of 50 Angstroms. It can be seen that the value of the intensity of the light integrated over the area of each of the detectors is approximately the same. Thus, the comparison steps of $0.9V_1-V_2$, $0.9V_2-V_3$ and $0.9V_3-V_1$ will all yield negative results, indicating non-coherent light, at least within a 50 Å wavelength range.

For some applications of laser light, however, a less coherent beam of light may be acceptable. Testing for coherence length within a broader bandwidth can be easily achieved in the context of the present invention by merely increasing the number of light samples taken per unit length of the Fizeau fringe pattern for the same optical cavity. This is achieved in the illustrated embodiment by substituting the five detector array 36 shown in dotted lines for the three detector array 12. This will increase the bandwidth discrimination from 50 Å to 100 Å, for example. It can now be seen that for the same beam of light, the output signal from detector $E_4$ is substantially less than that from any of the other detectors. Accordingly, $0.9V_3-V_4$ will yield a positive result, indicating a bandwidth of less than 100 Å.

This same effect can alternatively be achieved by keeping the number of detectors the same and substituting a different optical cavity having a smaller angle between the two reflecting surfaces. This spreads out the fringe pattern since the rate of change in optical path length is not as great, thereby decreasing the area of sample of each detector. It can be seen that this has the same effect as increasing the number of detectors per unit length. It is to be noted, however, that this procedure changes the thickness differential of the cavity over the length of the pattern being sensed, thereby reducing λ max.

Figure 6:
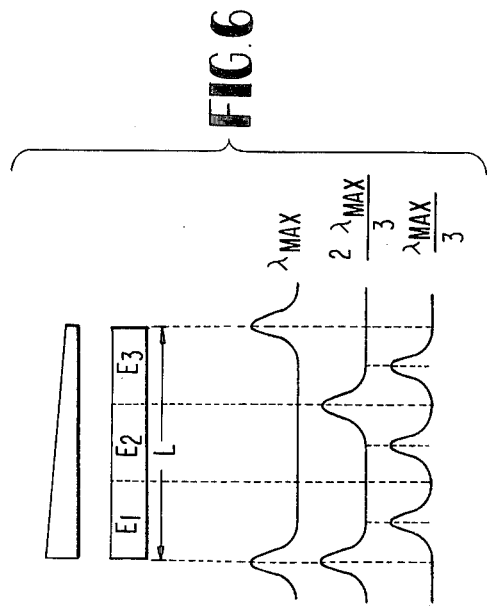
FIG. 6 is a view similar to that of FIG. 2, illustrating the relationship of the number of detectors to the minimum wavelength for which discrimination can be obtained.

The number of detectors used is also critical in eliminating "holes" in the detection of the peaks in the fringe pattern. For monochromatic light of wavelength λ max, the spacing of peaks in the fringe pattern is L, the width of the optical cavity, which is also the width of the detector array, as illustrated in FIG. 6. For light of wavelength 2λ max/3, the fringe spacing will be equal to ⅔ of the array width. This can lead to a condition where each detector detects an identical intensity for a three-detector array. That is, if one peak is present at one edge of the array, another peak will be at the junction of the two detectors closest to the opposite edge of the array, leading to the condition where each detector detects the same amount of light and all three detectors produce equal output signals. This results in a "hole" or a point where monochromatic light appears to be the same as broadband light which forms no fringe pattern.

It has been found that holes can appear for wavelengths defined by:

$$H \approx \frac{2\lambda_{max}}{n N_d}$$

where n is an integer greater than zero and $N_d$ is the number of light detectors in the array. Accordingly, to insure hole free measurement, the number of detector $N_d$ must be:

$$N_d > \frac{2\lambda_{max}}{\lambda_{min}}$$

where λ min is the minimum wavelength in the spectral range over which the measurement is desired.

Figure 7:
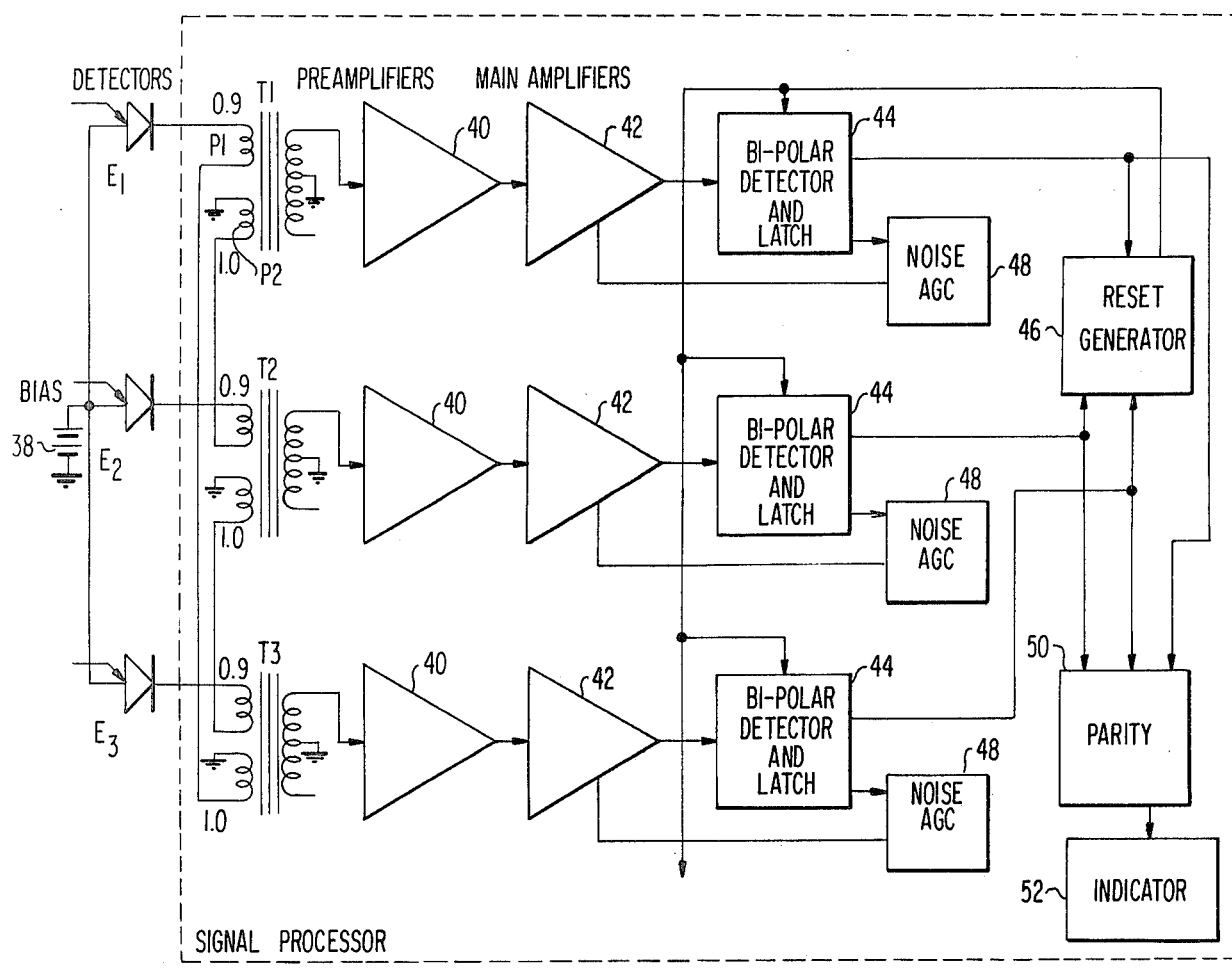
FIG. 7 is a schematic diagram of a circuit which performs the comparison and discrimination functions of the invention; and, FIG. 8 is a graph illustrating the comparison of the computed value of the intensity of a band of light in a Fizeau fringe pattern with the actual measured value of such a band.

FIG. 7 illustrates one example of a signal processor which performs the light value comparison and detection functions of the invention. The light detectors are shown as photodiodes $E_1$, $E_2$ and $E_3$. Each of the photodiodes is connected to a common source of D.C. bias potential 38 and produces a current at its output terminals proportional to the intensity of the pulses of the light shining on it. The output current from each photodiode passes through two coils whose windings are in the ratio 9:10. The coils form part of a three-winding transformer system which performs the comparison function.

Referring to transformer T1 of the transformer system, the primary windings consist of two coils P1 and P2 whose turn ratio is 9:10 as mentioned previously. The current flowing in P1 is proportional to $V_1$, the output current of detector $E_1$. The current in P2 flows in the opposite direction to that of P1 and is proportional to $V_2$, the output current of detector $E_2$. Due to the turns ratio and the direction of current flow, the output current of the secondary winding of transformer T1 is representative of the value $0.9V_1-V_2$. Transformer T2 and T3 operate in the same manner to provide the results $0.9V_2-V_3$ and $0.9V_3-V_1$, respectively. It can be seen that it is necessary to maintain the output currents of each of the detectors in phase with one another in order to obtain the difference between them, and for this reason the common source of potential is used for all of the detectors. It will be obvious to one of ordinary skill in the art that other circuitry which maintains the phase relationship of the output currents or which performs the subtracting function, such as a differential amplifiers which are suitably biased to provide the requisite signal proportions, can be substituted for the specific components disclosed herein.

The results from each of the detector output value comparisons are fed into a series of preamplifiers 40, and from there into a series of main amplifiers 42. The amplified difference value is fed as an input signal into a bipolar detector and latch circuit 44 for a determination of the polarity of the difference signal. The bipolar detector consists of two threshold comparators connected to the input line, one having a positive threshold value and the other a negative threshold value. Because the input signals occur in pulses which can come in at a very fast rate, a latch is connected with the threshold comparators to hold the output signal of the comparators, indicative of input signal polarity of an individual pulse, for a predetermined time necessary to make the coherence length determination. The latches are controlled by a reset generator 46 which, after receiving a signal that the latches have been set, sends an output signal to reset the latches when the predetermined time period has lapsed to sample a different pulse.

Also connected with the bipolar detector and latch circuit 44 is a noise automatic gain control circuit 48. This circuit measures the level of noise in the input signal to the bipolar detector and latch circuit and controls the gain of main amplifier 42 accordingly. As the noise level increases, the gain is decreased. This enables the threshold comparators of the bipolar detector to operate at a predetermined threshold to noise voltage ratio.

The signals stored in each latch of the bipolar detector and latch circuit 44 are fed as input signals into a parity checking circuit 50. The circuit checks for equality of signals and sends an output signal to indicator 52 indicative of whether such a condition exists. If all of the input signals are equal, i.e. all negative, indicator 52 will indicate non-coherent light. On the other hand, if at least one input signal is positive, parity will not exist and the indicator will be actuated to indicate coherent light. It is to be noted that in the disclosed embodiment at least one of the inputs to the parity checking circuit will always be negative, and therefore one need not be concerned with parity in the sense of all inputs being positive.

Figure 8:
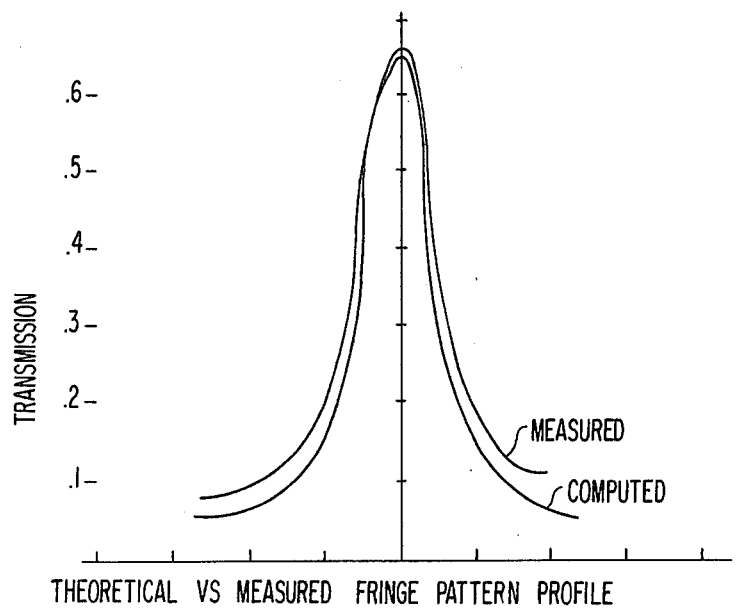

FIG. 8 graphically illustrates one example of the results obtained from a device constructed in accordance with the present invention. A multiple beam interferometer was constructed from a block of quartz 0.007 inch thick at the narrow edge with an angle between the two reflecting surfaces of 9 arc seconds.

It has been found that the difficulty in controlling the angle of the wedge shaped block during manufacture is most easily overcome by monitoring fringe spacing rather than the angle itself. This is done by passing a collimated, expanded laser beam of known wavelength through the interferometer and observing the interference fringe pattern with the eye or recording it photographically. This enables the achievement of high accuracy during manufacture since the measurement of a length (i.e. spacing between fringes) is inherently easier than measurement of an angle. Furthermore, fringe spacing and shape can be monitored in one convenient measurement. The observed fringe pattern includes the net effect of surface shape and refractive index, and so the uncertainty or variations caused by these parameters are eliminated as well.

The interferometer was cemented between two uncoated cover plates for support and protection. While the wedge and surface quality tolerances for the cover plates are not as tight as for the interferometer itself, they do affect system performance. This is because any imperfections in the surfaces of the upper cover plate can distort the wavefronts entering the interferometer, causing the fringes themselves to be distorted. The effect of the cemented surface of the upper plate is minimal because the refractive indices of the cement and upper plate were nearly matched. It is the upper surface of the upper plate which is most significant in this respect. There is the additional possibility that the cover plates will produce their own sets of interference fringes. Their effects can be minimized, however, by putting a relatively large wedge in the cover plates themselves (10 to 30 arc min).

The reflecting surfaces of the interferometer were coated with silver 100 Å thick with the resultant surface reflectivity being approximately 0.55, light transmission being 0.37 and absorption within the cavity being 0.08. A beam of He-Ne laser light having a center wavelength of 6328 Å was projected through the interferometer to generate a Fizeau fringe pattern. The transmitted intensity of the light in the fringe pattern was measured in the area of one order of the bands of light and compared with the theoretical value for such a band of light. As can be seen in FIG. 8, the curve which was actually obtained from the measurement very closely approximates the computed curve of what such measurement should be. From such it is apparent that the utilization of a wedge shaped optical cavity is highly satisfactory for evaluating the coherence length of a beam of light.

The present invention may be embodied in other specific forms without departing from the spirit or essential characteristics thereof. For example, a single light detector which is moved relative to the Fizeau fringe pattern to sense the light at various locations can be substituted for the multidetector array disclosed. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A method for determining if the coherence length of a beam of light exceeds a preselected threshold value, comprising the steps of:
    projecting the beam through a wedge-shaped optical device, said beam incident over the length of the optical device along the direction of varying thickness thereof, thereby generating a fringe pattern;
    sensing the magnitude of the light exiting the optical device at a plurality of locations simultaneously along the direction of varying thickness of the optical device; and
    simultaneously comparing the sensed magnitudes with one another to determine whether the coherence length of the light exceeds the preselected threshold value.

2. The method of claim 1 wherein the step of sensing comprises sensing the light at a minimum of three locations along the optical device.

3. The method of claim 1 wherein the step of comparing includes determining the polarity of the difference between a first sensed magnitude and a value proportional to a second sensed magnitude.

4. The method of claim 3 wherein determination of a predetermined polarity indicates that the light exceeds at least a selected threshold coherence length.

5. A light beam coherence length discriminator for discriminating between light beams having coherence lengths above and below a preselected threshold length comprising:
    means for generating an optical fringe pattern in response to a beam of light incident thereon;
    sensing means for simultaneously sensing the intensity of the light at a plurality of locations along the generated fringe pattern and producing a plurality of simultaneous output signals indicative of the intensity of the sensed light at the respective locations; and means for evaluating simultaneously the relative values of the output signals of the sensing means to provide an evaluation of the coherence length of the incident light.

6. The discriminator of claim 5 wherein said evaluating means includes means to determine the difference between the value of one output signal and a value proportional to the value of another output signal.

7. The discriminator of claim 6 wherein the evaluating means includes a detector for detecting the polarity of the difference determined by the determining means.

8. The discriminator of claim 5 wherein the means for generating includes a wedge-shaped optical device.

9. The discriminator of claim 5 wherein the sensing means comprises an array of light detectors which intercept the generated fringe pattern.

10. The discriminator of claim 9 wherein the means for generating includes a wedge-shaped optical device.

11. Apparatus for evaluating the coherence length of a light beam comprising:
a wedge-shaped optical member disposed in the path of the light beam to produce a fringe pattern on the side of the optical member opposite that which intercepts the light beam, the fringe pattern being characteristic of the frequency and spectral bandwidth properties of the incident light;
a plurality of light detectors disposed at locations of expected maximum and minimum intensities of the fringe pattern for light of a predetermined coherence length, each detector producing an output signal related to the intensity of light at its location;
means for evaluating the detector output signals relative to each other as an evaluation of the coherence length of the light beam.

12. The apparatus of claim 11 wherein said evaluating means includes means to determine the difference between the value of one output signal and a value proportional to the value of another output signal.

13. The apparatus of claim 12 wherein the evaluating means includes a detector for detecting the polarity of the difference determined by the determining means.

14. Apparatus for discriminating between pulsed beams of light having coherence lengths above and below a preselected coherence length threshold, such light having wavelengths falling within a desired range, comprising:
optical means for producing an interference fringe pattern from a pulsed beam of light incident thereon;
light detection means disposed adjacent said optical means and disposed to receive the fringe pattern for producing a set of output signals proportional to the maximum and minimum intensities of the fringe pattern; and
signal processing means connected to said light detection means for comparing such output signals with one another to determine whether the coherence length of the light is above or below the preselected coherence length threshold.

15. The apparatus as defined in claim 14 in which said optical means is a wedge-shaped block of light transmissive material having its surfaces partially reflective.

16. The apparatus as defined in claim 15 in which said light detection means is a plurality of contiguous photodiodes arrayed along the direction of varying thickness of said wedge-shaped block wherein the number of said photodiodes is equal to the number of maximum and minimum intensities of the fringe pattern for light falling within such desired range of wavelengths.

17. The apparatus as defined in claim 16 in which the finesse of said wedge-shaped block is adjusted so that the width of such maximum intensities is substantially equal to the width of said photodiode for light having coherence lengths exceeding such preselected threshold.

18. The apparatus as defined in claim 17, in which said signal processing means includes an input for receiving the output of each of said photodiodes wherein each of said inputs provides means for modifying the received signals by a preselected ratio determinative of the preselected coherence length threshold.

19. The apparatus as defined in claim 18 in which said signal processing means further includes means for determining the difference between a modified received signal and another unmodified received signal; and
means for determining the polarity of such difference.

20. The apparatus as defined in claim 19 in which said signal processing means further includes means for comparing the polarities of differences determined with respect to each of such modified and unmodified received signals, said means producing an indication of light having a coherence length greater than the preselected coherence length threshold when opposite polarities are determined.

21. The apparatus as defined in claim 16 in which the number of said photodiodes is greater than twice the maximum wavelength of the desired range divided by the minimum wavelength of such desired range.

* * * * *

Notice of Adverse Decision in Interference

In Interference No. 100,741, involving Patent No. 4,222,667, C. Layne, FIZEAU FRINGE LIGHT EVALUATOR AND METHOD, final judgment adverse to patentee was rendered Nov. 15, 1984, as to claims 1-15.
[*Official Gazette April 30, 1985.*]